(12) United States Patent
Medico et al.

(10) Patent No.: US 9,352,881 B2
(45) Date of Patent: May 31, 2016

(54) FLEXIBLE PACKAGING MANUFACTURED BY WELDING AND CONTAINING A MATERIAL THAT IS RECYCLED OR FROM RENEWABLE RESOURCES

(75) Inventors: Leonard Medico, Vouvry (CH); Jacques Thomasset, Vouvry (CH); Hugues-Vincent Roy, Vouvry (CH); Stephane Mathieu, Vouvry (CH)

(73) Assignee: AISAPACK HOLDING S.A., Vouvry (CH)

( * ) Notice: Subject to any disclaimer, the term of this patent is extended or adjusted under 35 U.S.C. 154(b) by 76 days.

(21) Appl. No.: 13/877,987

(22) PCT Filed: Oct. 21, 2011

(86) PCT No.: PCT/IB2011/054717
§ 371 (c)(1),
(2), (4) Date: Jul. 3, 2013

(87) PCT Pub. No.: WO2012/052971
PCT Pub. Date: Apr. 26, 2012

(65) Prior Publication Data
US 2013/0313283 A1 Nov. 28, 2013

(30) Foreign Application Priority Data

Oct. 22, 2010 (EP) ..................................... 10188610

(51) Int. Cl.
*B65D 35/10* (2006.01)
*B29C 65/40* (2006.01)
(Continued)

(52) U.S. Cl.
CPC ................ *B65D 35/10* (2013.01); *B29C 65/40* (2013.01); *B29C 66/038* (2013.01);
(Continued)

(58) Field of Classification Search
CPC  B29C 66/1122; B29C 66/4322; B29C 66/71; B29C 66/7234; B29C 65/40; B29C 65/5042; B29C 65/505; B29C 66/038; B29C 66/1142; B29C 66/1162; B29C 66/133; B29C 66/49; B29K 2023/06; B29K 23/086; B29K 2105/26; B29L 2023/20; B65D 35/10
USPC ........ 222/107, 1; 156/60, 73.5; 220/678–680; 383/121–127
See application file for complete search history.

(56) References Cited

U.S. PATENT DOCUMENTS 2,155,028 A * 4/1939 Westin ...................... B65B 7/14
493/264
3,066,063 A * 11/1962 Ecklund et al. ............... 156/203
(Continued)

FOREIGN PATENT DOCUMENTS

CH 570908 12/1975
CN 1980786 6/2007
(Continued)

OTHER PUBLICATIONS

English Translation of International Preliminary Report on Patentability for International (PCT) Patent Application No. PCT/IB2011/054717, dated Apr. 23, 2013, 8 pages.
(Continued)

*Primary Examiner* — Frederick C Nicolas
*Assistant Examiner* — Bob Zadeh
(74) *Attorney, Agent, or Firm* — Sheridan Ross P.C.

(57) ABSTRACT

The invention relates to an essentially tubular flexible packaging intended for containing a semi-liquid or pasty product, which includes an apron, a head, an added piece of material at least on the inside of the apron, and optionally a lid, the apron consists of a rolled-up sheet and includes a longitudinal weld for assembling the edges thereof together, and the head being attached to the edge of one of the ends of the apron. The apron includes a ratio of at least 30% of recycled material or material from renewable resources, and the added piece of material is arranged so as to eliminate a discontinuity in the inner surface in the area of the longitudinal weld.

20 Claims, 3 Drawing Sheets

(51) Int. Cl.
*B29C 65/00* (2006.01)
*B29K 105/26* (2006.01)
*B29L 23/20* (2006.01)
*B29L 23/00* (2006.01)

(52) U.S. Cl.
CPC ........ *B29C 66/1122* (2013.01); *B29C 66/1142* (2013.01); *B29C 66/133* (2013.01); *B29C 66/4322* (2013.01); *B29C 66/49* (2013.01); *B29C 66/0382* (2013.01); *B29C 66/0384* (2013.01); *B29C 66/5344* (2013.01); *B29C 66/71* (2013.01); *B29C 66/723* (2013.01); *B29C 66/7212* (2013.01); *B29C 66/7234* (2013.01); *B29C 66/72321* (2013.01); *B29C 66/72328* (2013.01); *B29K 2105/26* (2013.01); *B29L 2023/001* (2013.01); *B29L 2023/20* (2013.01); *Y02W 90/11* (2015.05)

(56) References Cited

U.S. PATENT DOCUMENTS

| | | | | |
|---|---|---|---|---|
| 3,855,380 | A * | 12/1974 | Gordon et al. | 264/37.31 |
| 3,936,334 | A * | 2/1976 | Kushida et al. | 156/69 |
| 3,962,006 | A * | 6/1976 | Saito et al. | 156/69 |
| 5,524,778 | A * | 6/1996 | De Caluwe et al. | 215/12.2 |
| 7,171,988 | B2 * | 2/2007 | Gejima | B21D 26/045 |
| | | | | 138/156 |
| 2005/0181156 | A1 * | 8/2005 | Schmidt | B32B 27/18 |
| | | | | 428/35.7 |
| 2010/0000674 | A1 * | 1/2010 | Voigtmann | 156/280 |
| 2011/0036846 | A1 * | 2/2011 | Corbett | B65D 65/466 |
| | | | | 220/495.03 |

FOREIGN PATENT DOCUMENTS

| | | | |
|---|---|---|---|
| CN | 101098817 | 1/2008 | |
| CN | 101258020 | 9/2008 | |
| CN | 101522394 | 9/2009 | |
| CN | 101801643 | 8/2010 | |
| DE | 2008085 | * 9/1971 | ............ B29D 23/10 |
| FR | 2164825 A1 | 8/1973 | |
| FR | 2233250 A1 | 1/1975 | |
| GB | 1421176 | 1/1976 | |
| GB | 1468256 | 3/1977 | |
| GB | 1471783 A | 4/1977 | |

OTHER PUBLICATIONS

International Search Report prepared by the European Patent Office on Apr. 25, 2012, for International Application No. PCT/IB2011/054717.

Official Action with English Translation for China Patent Application No. 201180050845.6, dated Mar. 7, 2014, 17 pages.

* cited by examiner

FLEXIBLE PACKAGING MANUFACTURED BY WELDING AND CONTAINING A MATERIAL THAT IS RECYCLED OR FROM RENEWABLE RESOURCES

CROSS REFERENCE TO RELATED APPLICATIONS

This application is a national stage application under 35 U.S.C. 371 and claims the benefit of PCT Application No. PCT/IB2011/054717 having an international filing date of 21 Oct. 2011, which designated the United States, and which PCT application claimed the benefit of European Patent Application No. 10188610.9 filed 22 Oct. 2010, the disclosure of which is incorporated herein by reference.

FIELD OF THE INVENTION

The invention relates to the field of tubular packagings intended to contain, for example, toothpaste, cosmetics or food products. The packaging is manufactured by assembling components manufactured beforehand and comprises at least one head, a skirt and optionally a cap. The packaging may also comprise a base manufactured beforehand.

PRIOR ART

In such packagings, the head has a substantially truncated conical shape on which a cylinder is located forming the neck, the external face of the neck possibly being threaded in order to receive a cap that is screwed thereon. Alternatively, the external face of the neck is not threaded, the cap being fixed in place simply by applying pressure. Generally, the head and the cap are plastic parts produced by injection molding or compression molding.

The skirt, once formed, has a substantially tubular shape. It is made from printed or virgin rolls of multilayer laminate.

When the packaging comprises a base, the latter has a substantially planar geometry the circumference of which is circular.

A common process for manufacturing these packagings comprises at least the following steps:
  a laminate is rolled around a rod with a circular cross section and welded so as to continuously form a cylindrical tube. The cylinder is then cut into skirts of set length;
  the head is automatically loaded into the device; and
  the head is fixed to one end of the skirt.

Another process for manufacturing these packagings comprises at least the following steps:
  a laminate is rolled around a rod with a circular cross section and welded so as to continuously form a cylindrical tube. The cylinder is then cut into skirts of set length; and
  the head is overmolded by injection or compression molding onto one end of the skirt.
  When the packaging comprises a base,
  the base is automatically loaded into the device; and
  the base is fixed to the second end of the skirt.

FR 2 164 825 describes a double-walled compressible tube the internal tube of which is made into a cylinder by rolling-up a sheet so that the lateral edges of the sheet overlap, and by simultaneously applying a small amount of water-resistant material to at least the edge of the sheet so that the internal film, which is made of polyvinyl alcohol, is not exposed to the substance to be contained in the internal tube.

SUMMARY OF THE INVENTION

One aim of the present invention is to enable manufacture of a flexible tube or a flexible bottle by welding, said tube or said bottle having a content of recycled material or of material obtained from renewable resources higher than 30 vol % and preferably higher than 50 vol %.

Production of packagings having the features described above, especially comprising a proportion of recycled material or of material obtained from renewable resources, presents a number of difficulties. The main difficulty results from the fact that the tubular body of the packaging, which is obtained by welding a generally multilayer sheet (called a "laminate" in the following), comprises, in said weld zone, a discontinuity at least in the internal layer, which makes joining the head of the tube to said tubular body problematic. During this assembly step, said discontinuity generates defects in the manufactured packaging, such as leaks or visible defects, making it unsuitable for sale.

Specifically, the laminates used for manufacturing tubular bodies by welding, and comprising a high percentage of recycled material or material obtained from renewable resources, are often difficult to compress. This is the case for example of laminates comprising a high cellulose fiber content. Although these laminates can be welded when said laminate comprises a weldable surface layer, in contrast the weld obtained is almost incompressible and therefore the internal surface of the tubular body exhibits a large discontinuity at the weld; said discontinuity is the cause of the defects encountered during assembly of the tubular body and the tube head.

Certain tubular bodies comprising a high proportion of recycled material or of material obtained from renewable resources could be compressed in the weld zone, when said materials become sufficiently fluid during compression, so as to overcome the aforementioned problem. However, in many cases, these recycled materials or materials obtained from renewable resources must not make direct contact with the products contained in the packaging, thereby precluding compression of the welded zone. This is because said compression would cause the confined recycled resin, which is unsuitable for food contact, to be squeezed onto the internal face of the packaging. Specifically, it is known that not all recycled materials are cleared for food contact, thereby making it difficult to use large amounts of them in the manufacture of tubes by welding.

In the description of the invention, the following terms and abbreviations are used:
  recycled material: material extracted from waste. It comes from objects or packaging having completed a first use cycle (or life cycle), i.e. having already served their first purpose;
  material obtained from renewable resources: material obtained from a natural resource that can be replenished over a short period of time on the human scale;
  virgin material: material cleared for food contact;
  PE: polyethylene;
  EVOH: ethylene vinyl alcohol; and
  PET: polyethylene terephthalate.

To overcome the problems identified above, the invention especially comprises adding an additional material on the internal face of the tubular body in the location of the longitudinal weld, said additional material not only removing the discontinuity in the internal surface at the weld but also making it easier to join the tube head to said tubular body.

According to the invention, the additional material comprises at least one layer of material making it weldable to the internal surface of the tubular body and making it weldable to the tube head.

The additional material may be a monolayer or a multilayer. A multilayer additional material makes it possible to improve the barrier properties of the packaging and to prevent migration, via the edge face of the laminate, of substances contained in the recycled layers and unsuitable for food contact. A multilayer additional material also makes it possible to reinforce the welded zone, said reinforcement being particularly useful when the recycled layers contain a high content of fillers or unweldable materials.

The additional material allows the internal surface of the tubular body to be smoothed in order to make it easier to join the tube head and the tubular body. The concept of adding material according to the present invention may also be used to remove any discontinuity in the external surface of the tubular body in order to improve its appearance, strength and impermeability.

In a first embodiment of the invention, the additional material is extruded, or coextruded, at the moment when the longitudinal weld is produced or subsequently to production of the longitudinal weld.

In a second embodiment, a bead of filler or a strip of filler is used, this filler being at least partially molten at the moment when it is applied to the tubular body. The molten layers must represent at least 50 vol % of said bead or said strip in order to remove the discontinuity in the internal layer of the tubular body.

The invention may be applied to various laminate welding configurations. The invention may be used when the laminate is welded by overlap of two ends, configuration in which the external layer is welded to the internal layer of the laminate.

The invention may also be used when the internal face of the laminate is welded to itself.

Finally, the invention may be used when the ends of the laminate are butt welded.

BRIEF DESCRIPTION OF THE FIGURES

The invention will be better understood by way of FIGS. 1 to 6, in which:

FIG. 3 shows the use of an additional material to compensate for the discontinuity in the weld zone when the laminate is welded by overlapping its ends;

FIG. 4 illustrates a variant in which the lower end of the laminate is completely imprisoned in the additional material;

FIG. 5 shows the application of the invention when the laminate is butt welded;

FIG. 6 illustrates the invention when the internal face of the laminate is welded to itself.

DETAILED DESCRIPTION OF THE INVENTION

Figure 1:
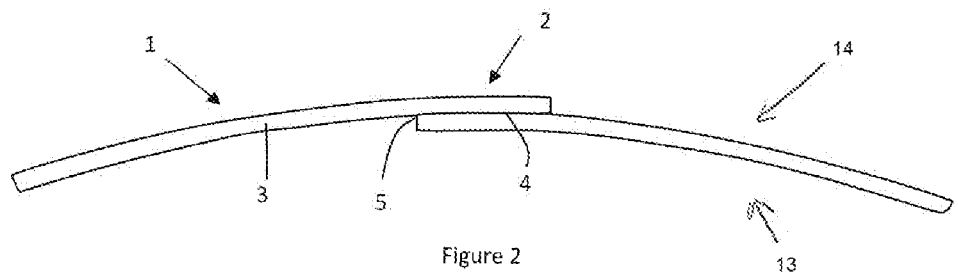
FIG. 1 shows, in the weld zone, the skirt obtained by welding of a laminate.
Figure 2:
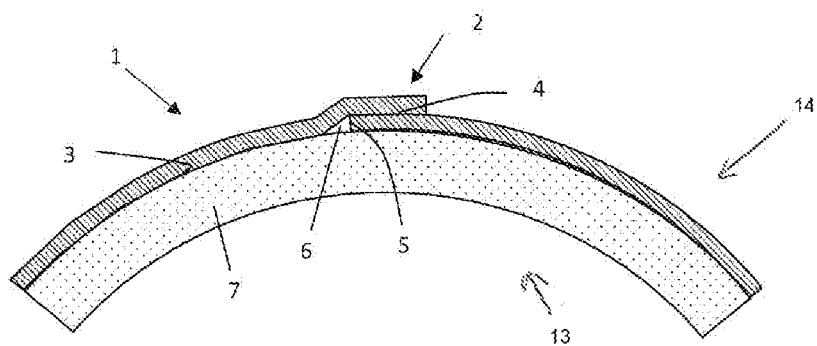
FIG. 2 illustrates imperfections in the assembly of the tube head and the skirt shown in FIG. 1.

FIGS. 1 and 2 allow the problem to be solved to be understood.

FIG. 1 shows a skirt 1 formed by welding a laminate 3 having a content of recycled material or of material obtained from renewable resources higher than 30%. The interior of the skirt 13 is welded to the exterior of the skirt 14 by overlapping the ends of said laminate 3 to form a longitudinal weld 9. This type of joint has the advantage of a high weld strength because the length of the welded interface 4 may be adjusted as required. However, because a laminate 3 comprising a certain percentage of recycled material has been used, the weld zone 2 of the laminate 3 is hardly compressed at all, thereby causing a large discontinuity 5 to form in the interior of the skirt 13. This discontinuity 5 is the origin of the difficulties encountered during assembly of the tube head 7 and said skirt 1. There are a number of reasons why the welded zone 2 is not compressed.

In a first instance, the slight compression of the welded zone 2 is directly related to the nature of the layers forming the laminate 3. Compression becomes difficult, for example, when the laminate 3 comprises a high percentage of layers that do not melt during the welding operation; this is especially the case for laminates 3 comprising a high percentage of cellulose fibers.

In a second instance, the welded zone 2 cannot be compressed for reasons of hygiene. This is especially the case when the laminate 3 comprises a high percentage of recycled materials that must not make contact with the product contained in the packaging. Compression of the welded zone 2 would squeeze materials unsuitable for food contact onto the internal face of the packaging.

In a third instance, the zone 2 is not compressed in order to prevent materials that might not weld to the tube head 7 from being squeezed onto the interior of the skirt 1. This is the case for materials obtained from renewable resources having a poor weldability.

Thus, in the case of skirts 1 comprising a high proportion of recycled material or of material obtained from renewable resources, the weld zone 2 is generally not compressed for the aforementioned reasons. This results in the large discontinuity 5, which generates defects in the packaging during joining of the tube head 7.

FIG. 2 illustrates the defects obtained when the skirt 1 illustrated in FIG. 1 is joined to a tube head 7 by welding. More precisely, FIG. 2 shows a cross-sectional view of part of the joint between the skirt 1 and the tube head 7.

When the tube head 7 and the skirt 1 are joined by welding, there is observed, at the discontinuity 5, a zone where the skirt 1 is not welded to the tube head 7, forming a passage between the interior of the skirt 13 and exterior of the skirt 14. This leak 6 at the discontinuity 5 prevents said packagings from being used commercially.

When the skirt 1 and the tube head 7 are joined by overmolding the tube head 7 onto the skirt 1, a defect is again created at the discontinuity 5. Specifically, during the molding operation, when the molten resin arrives at the discontinuity 5, it escapes from the molding cavity via the channel formed by the discontinuity 5. The resin that escapes in this way welds to the skirt 1 along the discontinuity 5 and generates a visible defect. The stiffness of the skirt 1 is also modified at the resin leak, thereby adversely affecting not only the appearance of the packaging but also its usage properties.

Figure 3:
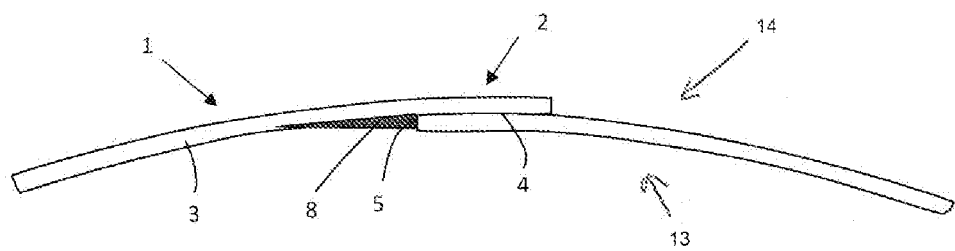
FIGS. 3 to 6 illustrate the invention, and more precisely.

FIG. 3 illustrates a first embodiment of the invention. This embodiment comprises an additional material 8 on the interior of the skirt 13 at the discontinuity 5. This additional material 8 smoothes the interior of the skirt 13 at the discontinuity 5. The additional material 8, which is either a monolayer or a multilayer, makes up only a small percentage of the skirt 1. The selection of materials must take into account the need to weld the additional material 8 both to the interior of the skirt 13 and to the external face of the tube head 7. In the case where the additional material 8 is a multilayer, said addition will comprise at least one layer allowing it to be welded to the interior of the skirt 13 and to the external face of the shoulder. The use of a multilayer additional material may prove to be an advantageous way of limiting, for example, the permeability of the packaging at the welded interface 4, and of limiting, for example, migration of oxygen molecules that penetrate into the packaging. Another benefit could also be to limit migration, via the edge face of the laminate 3, of substances contained in the packaged product. The additional material does not generally comprise recycled materials because it makes direct contact with the packaged product.

Figure 4:
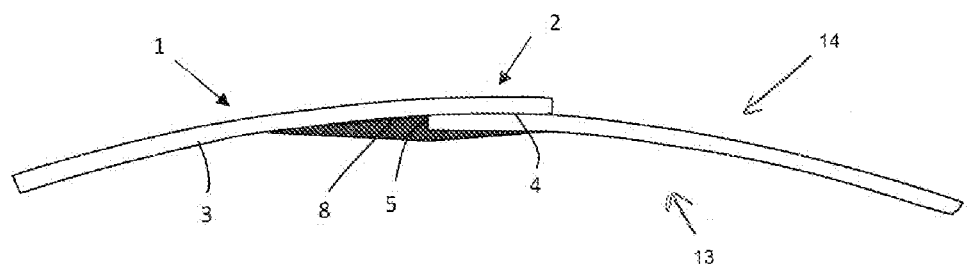

FIG. 4 illustrates a variant of the first embodiment of the invention according to which the additional material 8 smoothes the discontinuity 5 and totally encapsulates the end of the laminate 3. This encapsulation is particularly advantageous when the laminate 3 comprises at least one low cohesion layer. Encapsulation of the end of the laminate 3 allows the weld 4 to be reinforced. The variant illustrated in FIG. 4 is particularly beneficial when the laminate 3 comprises a high content of recycled paper or low-grade recycled material.

A variant (not illustrated) of the first embodiment consists in adding a second additional material to the exterior of the skirt 14 at the discontinuity. This added material may improve the appearance, the mechanical properties, or the barrier properties of the packaging.

Figure 5:
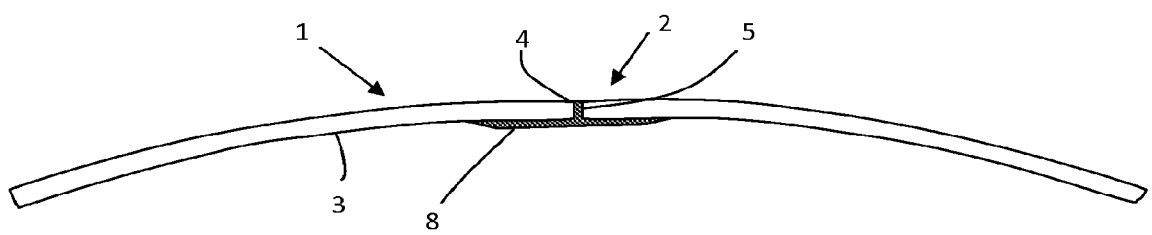

FIG. 5 illustrates a second embodiment of the invention, in which the laminate 3 is butt welded. Butt welding of laminates comprising a high percentage of recycled layers or layers obtained from renewable resources presents a number of difficulties because only a small percentage of the thickness of the laminate may effectively be welded. As FIG. 5 shows, the additional material 8 is required to fill the discontinuity 5 that forms between the two ends of the laminate 3. As FIG. 5 shows, the additional material 8 may spread over the interior of the skirt 13 in order to increase, conjointly, the strength of the welded zone 2. It is important to underline the continuity between the interior of the skirt 13 and the surface of the additional material 8. As was mentioned above, the additional material may be applied in the form of a strip that melts at least partially during its application. It has been found that this strip should, preferably, at least contain 50% molten resin at the moment when it is applied in order to ensure the continuity of the interior of the skirt 13 (smooth surface).

Figure 6:
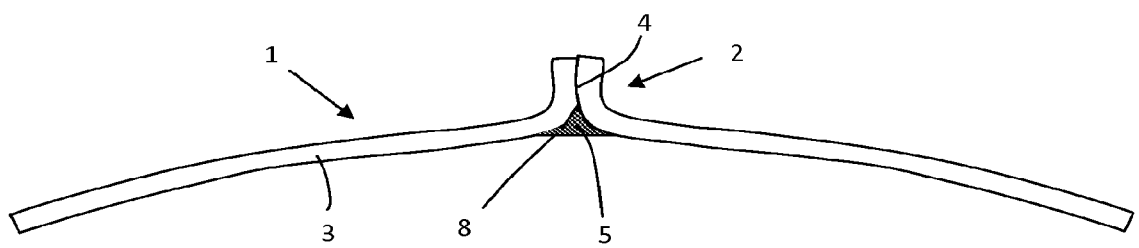

A third embodiment of the invention is shown in FIG. 6. According to this embodiment, the internal face of the laminate is welded to itself and forms the welded interface 4. An additional material 8 is used to remove the discontinuity 5 that forms under the weld, and to make the interior of the skirt 13 smooth and continuous.

Figure 7:
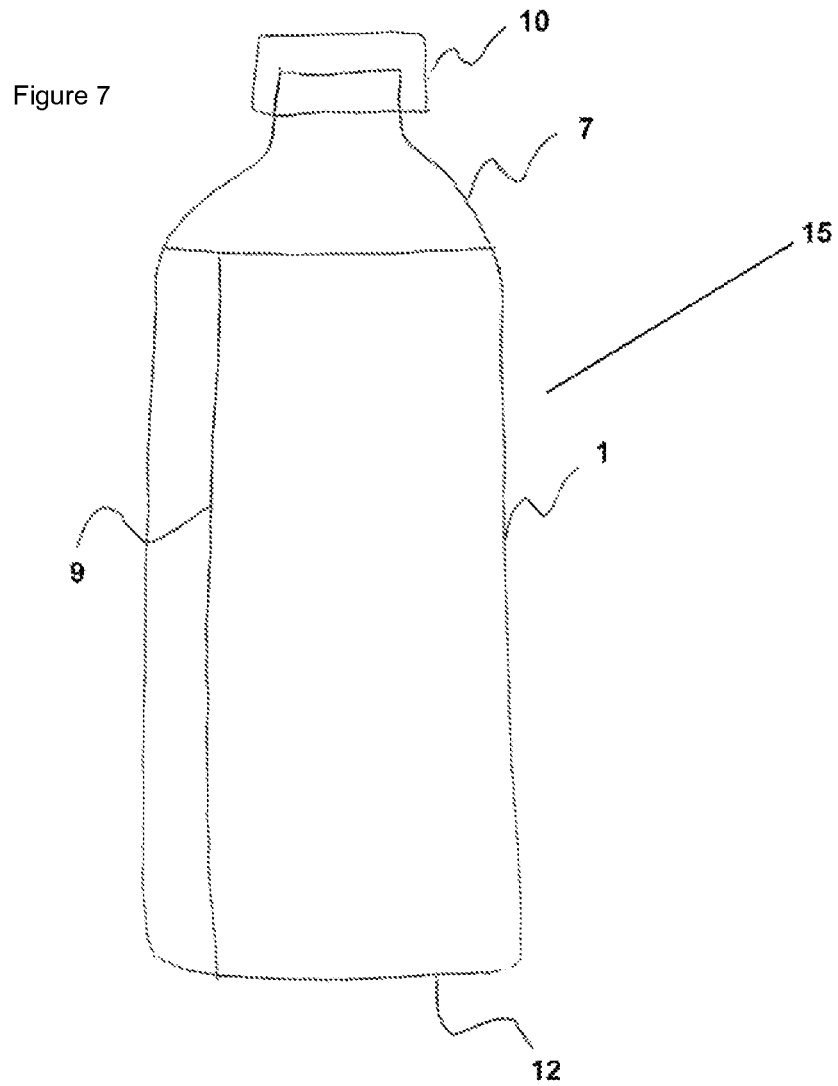
FIG. 7 illustrates the invention from a perspective view.

FIG. 7 illustrates one embodiment of the tubular flexible packaging 15 comprised of the skirt 1, head, 7, cap 10, base 12, and longitudinal weld 9.

As will be understood from the present description, the invention simplifies the assembly operation used to join the tube head 7 and the skirt 1 by removing the discontinuity in the interior of the skirt 13 by adding an additional material at said discontinuity. The additional material may also be used to smooth the exterior of the skirt 14 in order to improve its appearance, its strength and its barrier properties.

The invention allows the continuity of the interior of the skirt to be considerably improved. For example, an initial discontinuity of 400 microns is reduced by virtue of the invention to a value smaller than 50 microns and preferably smaller than 20 microns.

The additional material is either a monolayer or a multilayer. At least 50% of the material from which it is formed welds to the interior of the skirt 13 and to the external face of the tube head 7, and melts during application to the skirt 1, in order to remove the discontinuity. Advantageously, this welding material is identical in nature to the material of the interior of the skirt, and to that of the external face of the tube head 7.

The additional material may be applied by extrusion to the internal surface of the laminate 3 at the moment when the operation of welding the skirt 1 is carried out. The additional material may also be applied by adding a filament or a strip that melts at least partially during the operation of welding the skirt.

This invention is particularly advantageous for producing tubes with laminates comprising a high percentage of recycled material or material obtained from renewable resources. This laminate 3 comprises at least one thin welding layer on its internal face, which layer guarantees safety in food contact and weldability. The internal layer is for example made of virgin PE, i.e. PE resin that is cleared for food contact. This virgin PE layer may be obtained from recycled material depending on the legislation in force. The thickness of this layer is between 5 and 40% of the total thickness of the laminate 3, and preferably between 10 and 20%. This laminate 3 also comprises at least one layer made from recycled material or from material obtained from renewable resources. The content by volume, in the laminate, of recycled material or of material obtained from renewable resources is higher than 30% and preferably higher than 50%.

The laminate 3 advantageously comprises an additional layer having barrier properties and located between the weldable internal layer and the layer made from recycled material or from material obtained from a renewable resource. This barrier layer could be an aluminum film, an EVOH film, or a film having a hermetic surface coating. This barrier layer stops migration, in the packaging, of substances that are not cleared for food contact, which substances may possibly be present in the recycled layers. The laminate 3 advantageously comprises other layers forming the exterior of the skirt. This exterior may be a protective PE or PET film or a film made from recycled material or from a renewable resource.

Advantageously, the tube head 7 comprises more than 30% recycled material or material obtained from a renewable resource, and preferably more than 50%. The tube head 7 comprises an internal layer that guarantees safety in food contact. This internal layer may be a layer of virgin PE or a coating. The tube head 7 may be produced by two-shot injection or two-shot compression molding. Alternatively, the tube head 7 may be obtained by joining two molded parts. Another method that can be used to obtain the tube head 7 consists in depositing a coating on the part of the tube head 7 that makes contact with the packaged product. A last method consists in overmolding a film (IML) or an insert forming the internal surface of the tube head 7.

Alternatively, the tube head 7 comprises more than 30% material obtained from renewable resources, and preferably more than 50%. Advantageously, the tube head 7 is produced by injection or compression molding of a resin filled with natural fibers (cellulose fibers) suitable for direct contact with food stuffs.

One of two methods may be used to fix the tube head 7 to the skirt 1. The first method consists in manufacturing the tube head 7 beforehand using one of the methods described above and then welding the tube head 7 and the skirt 1 by heating the interface to be welded. A second method of fixing the tube head 7 to the skirt 1, called "overmolding", consists in fixing the tube head 7 to the skirt 1 conjointly with the operation of molding said tube head 7. In this method, enough heat is stored by the molded material to ensure it welds with the skirt 1.

The invention is not limited to the production of tubes, it also applies to the manufacture of bottles formed by assembling a skirt 1, a head 7 and a base 12. The invention, described above for the assembly of a head 7 and a skirt 1, may also be used to simplify assembly of a base 12 and a skirt 1. The invention thus allows bottles comprising a high percentage of recycled material or material obtained from renewable resources to be manufactured.

Advantageously, the cap 10 of the packaging comprises more than 30% recycled material or material obtained from a renewable resource, and preferably more than 50%. The cap 10 is produced by injection or compression molding of recycled material or material obtained from renewable resources. In the case where the injection molded material is not compatible with food stuffs, a protective membrane is placed between the mouth of the head 7 and the cap 10. This membrane is generally a film comprising an internal PE layer that couples with the perimeter of the mouth of the head 7. An internal liner also prevents direct contact with the food stuffs.

Embodiments

Laminate (outside to inside; content (in %) of recycled material or of material obtained from renewable resources):

| | | Content |
|---|---|---|
| a) | 200 μm recycled PE/10 μm EVOH/40 μm virgin PE | 80% |
| b) | 200 μm recycled PE/12 μm Al/40 μm virgin PE | 80% |
| c) | 50 μm recycled material/100 μm recycled PE/5 μm EVOH/20 μm virgin PE | 85% |
| d) | 100 μm recycled PE/60 μm recycled material/10 μm EVOH/30 μm virgin PE | 80% |
| e) | 12 μm PET/230 μm recycled PE/7 μm Al/40 μm virgin PE | 80% |
| f) | 80 μm recycled PE/100 μm recycled paper/5 μm EVOH/30 μm virgin PE | 84% |

Additional material:

| | | Content |
|---|---|---|
| a) | 42% virgin PE/16% virgin PET/42% virgin PE | 0% |
| b) | 38% virgin PE/25% virgin PET/37% virgin PE | 0% |
| c) | 100% virgin PE | 0% |
| d) | 45% virgin PE/10% virgin EVOH/45% virgin PE | 0% |

Head (content (in %) of recycled material or of material obtained from renewable resources):

| | | Content |
|---|---|---|
| a) | recycled PE + internal face coating | 99% |
| b) | recycled material + PE insert (the welded zone is part of the insert) | 60% |
| c) | recycled PE/overmolded virgin PE | 70% |
| d) | recycled PE/two-shot injection or compression molded virgin PE | 70% |
| e) | Compound PE + cellulose fibers (filled to 60%) | 60% |

Base (content (in %) of recycled material or of material obtained from renewable resources):

| | | Content |
|---|---|---|
| a) | recycled PE + internal face coating | 99% |
| b) | recycled material + PE insert (the welded zone is part of the insert) | 60% |
| c) | recycled PE/overmolded virgin PE | 70% |
| d) | recycled PE/two-shot injection or compression molded virgin PE | 70% |
| e) | Compound PE + cellulose fibers (filled to 60%) | 60% |

Cap (content (in %) of recycled material or of material obtained from renewable resources):

| | | Content |
|---|---|---|
| a) | recycled PE | 100% |
| b) | recycled PE/overmolded virgin PE | 70% |
| c) | Compound PE + cellulose fibers (filled to 60%) | 60% |

Examples of packaging according to the invention:
i) A tube with a diameter of 35 mm and a skirt that is 140 mm in length composed of:
   a laminate having a weight of 3.7 g and comprising 80% recycled material;
   an additional material having a weight of 0.04 g;
   a head having a weight of 1.7 g, comprising 70% recycled material;
   a cap having a weight of 1 g, made of 100% recycled material; and
   a membrane having a weight of 0.02 g.
This packaging therefore has a total weight of 6.46 g and contains 80% recycled material. The head and the skirt are assembled by welding.
ii) A tube with a diameter of 35 mm and a skirt that is 140 mm in length composed of:
   a laminate having a weight of 3.7 g and comprising 60% material obtained from renewable resources;
   an additional material with a width of 4 mm and an average thickness of 80 μm having a weight of 0.04 g;
   a head having a weight of 1.7 g, comprising 60% material obtained from renewable resources; and
   a cap having a weight of 1 g, comprising 60% material obtained from renewable resources.
This packaging therefore has a total weight of 6.44 g and contains 60% material obtained from renewable resources. The head and the skirt are assembled by overmolding.

The invention claimed is:

1. An essentially tubular flexible packaging intended to contain a semiliquid product or paste, said packaging comprising a skirt being formed by a rolled-up sheet comprising an interior, exterior, and two ends each having a perimeter, a head, and an additional material at least on the interior of the skirt, the rolled-up sheet further comprising a longitudinal weld joining the edges of the sheet in a longitudinal weld zone, said longitudinal weld zone is not compressed, the head being fixed to the perimeter of one of the ends of the skirt wherein a discontinuity is formed at least in the longitudinal weld zone on the interior of the skirt; said packaging being characterized in that the skirt has a content of recycled material or of material obtained from renewable resources of at least 30% and in that said additional material is placed so as to remove the discontinuity.

2. The packaging as claimed in claim 1, characterized in that the content of said recycled material or of said material obtained from renewable resources in the skirt is higher than 50%.

3. The packaging as claimed in claim 2, characterized in that said content of said recycled material or of said material obtained from renewable resources is higher than 70%.

4. The packaging as claimed in one of the preceding claims, characterized in that the content of said recycled material or of said material obtained from renewable resources in the head is higher than 30%.

5. The packaging as claimed in claim 4, characterized in that the content of said recycled material or of said material obtained from renewable resources in the head is higher than 50%.

6. The packaging as claimed in one of the preceding claims, further comprising a base fixed to the perimeter of the other end of the skirt.

7. The packaging as claimed in claim 6, characterized in that the content of said recycled material or of said material obtained from renewable resources in the base is higher than 30%.

8. The packaging as claimed in claim 6, characterized in that the content of said recycled material or of said material obtained from renewable resources in the base is higher than 50%.

9. The packaging as claimed in one of the preceding claims, characterized in that the skirt is made from a sheet comprising at least one virgin PE layer on said interior and at least one layer made from said recycled material or said material obtained from renewable resources.

10. The packaging as claimed in one of the preceding claims, wherein the sheet has an upper face and a lower face, characterized in that the longitudinal weld is produced by overlapping the edges of the sheet forming the skirt and welding the upper face of the sheet to the lower face of the sheet.

11. The packaging as claimed in one of claims 1 to 9, further comprising an end at each joined edges of said sheet, characterized in that the longitudinal weld is produced by joining said ends of the edges of the sheet forming the skirt.

12. The packaging as claimed in one of claims 1 to 9, characterized in that the longitudinal weld is produced by overlapping the edges of the sheet forming the skirt and welding a lower face of the sheet to the lower face of the sheet.

13. The packaging as claimed in one of the preceding claims, characterized in that the additional material covers at least one of the edges of the sheet.

14. The packaging as claimed in one of the preceding claims, characterized in that the additional material covering the longitudinal weld of the skirt is also placed on the exterior of the skirt.

15. The packaging as claimed in one of the preceding claims, in which the additional material is added via extrusion or welding.

16. The packaging as claimed in one of the preceding claims, in which the additional material is a monolayer or multilayer.

17. The packaging as claimed in one of the preceding claims, in which the head is manufactured beforehand and then joined to the skirt by welding.

18. The packaging as claimed in one of the preceding claims, in which said head is joined to the skirt by overmolding in an injection or compression molding process.

19. The packing as claimed in claim 1, further comprising a cap.

20. The packaging as claimed in claim 1, wherein the discontinuity is located between the head and the skirt.

* * * * *